US011936287B2

(12) United States Patent
Wu

(10) Patent No.: US 11,936,287 B2
(45) Date of Patent: Mar. 19, 2024

(54) SELF-DRIVEN ACTIVE CLAMP CIRCUIT

(71) Applicant: MINMAX TECHNOLOGY CO., LTD., Tainan (TW)

(72) Inventor: Cheng-Chou Wu, Tainan (TW)

(73) Assignee: MINMAX TECHNOLOGY CO., LTD., Tainan (TW)

( * ) Notice: Subject to any disclaimer, the term of this patent is extended or adjusted under 35 U.S.C. 154(b) by 169 days.

(21) Appl. No.: 17/689,276

(22) Filed: Mar. 8, 2022

(65) Prior Publication Data
US 2023/0291299 A1  Sep. 14, 2023

(51) Int. Cl.
| | |
|---|---|
| H02M 1/34 | (2007.01) |
| H02M 3/335 | (2006.01) |
| H02M 1/00 | (2006.01) |

(52) U.S. Cl.
CPC .......... *H02M 1/342* (2021.05); *H02M 1/0058* (2021.05); *H02M 3/335* (2013.01); *H02M 3/33569* (2013.01)

(58) Field of Classification Search
CPC .......... H02M 1/34–348; H02M 3/335–33523; H02M 3/33569; H02M 3/33576; H02M 3/33592; H02M 3/338
See application file for complete search history.

(56) References Cited

U.S. PATENT DOCUMENTS

| | | | |
|---|---|---|---|
| 6,452,818 B1* | 9/2002 | Simopoulos | ...... H02M 3/33592 363/21.04 |
| 7,764,515 B2 | 7/2010 | Jansen et al. | |
| 10,811,978 B1 | 10/2020 | Zheng et al. | |
| 2005/0185425 A1* | 8/2005 | Liang | ................ H02M 3/33571 363/16 |
| 2009/0257255 A1* | 10/2009 | Zhang | .................... H02M 3/335 363/50 |
| 2013/0294118 A1 | 11/2013 | So et al. | |
| 2018/0091039 A1* | 3/2018 | Bastholm | ................ H02M 1/34 |
| 2018/0183346 A1* | 6/2018 | Strijker | .................... H02M 1/32 |

(Continued)

FOREIGN PATENT DOCUMENTS

| | | | |
|---|---|---|---|
| CN | 101572490 A | | 11/2009 |
| CN | 102170232 A | * | 8/2011 |

(Continued)

OTHER PUBLICATIONS

Machine translation of CN-102170232-A, originally published Aug. 31, 2011. (Year: 2011).*

*Primary Examiner* — Fred E Finch, III
(74) *Attorney, Agent, or Firm* — Birch, Stewart, Kolasch & Birch, LLP

(57) ABSTRACT

A self-driven active clamp circuit applied to a flyback converter having a transformer and a switch has a clamp switch and a resistor. The clamp switch is connected between a first capacitor and a second capacitor in series. Another terminal of the first capacitor is connected to a first terminal of a primary-side winding of the transformer. Another terminal of the second capacitor is connected to a second terminal of the primary-side winding of the transformer and the switch of the flyback converter. A terminal of the resistor is connected to a control terminal of the clamp switch. Another terminal of the resistor is connected to the second terminal of the primary-side winding of the transformer and the switch of the flyback converter.

3 Claims, 4 Drawing Sheets

(56) References Cited

U.S. PATENT DOCUMENTS

2021/0143730 A1* 5/2021 Yang ................. H02M 3/33507
2023/0291317 A1* 9/2023 Wu ......................... H02M 1/34
　　　　　　　　　　　　　　　　　　363/21.07

FOREIGN PATENT DOCUMENTS

| CN | 104485823 | A | 4/2015 |
| CN | 107196517 | B | 7/2019 |
| TW | 521481 | B | 2/2003 |
| WO | WO2009/128728 | A2 | 10/2009 |

* cited by examiner

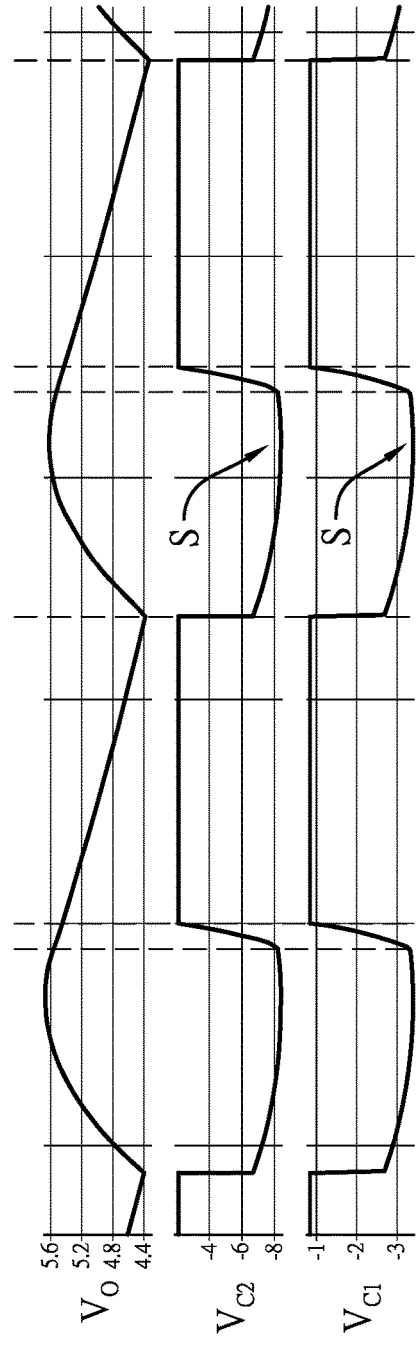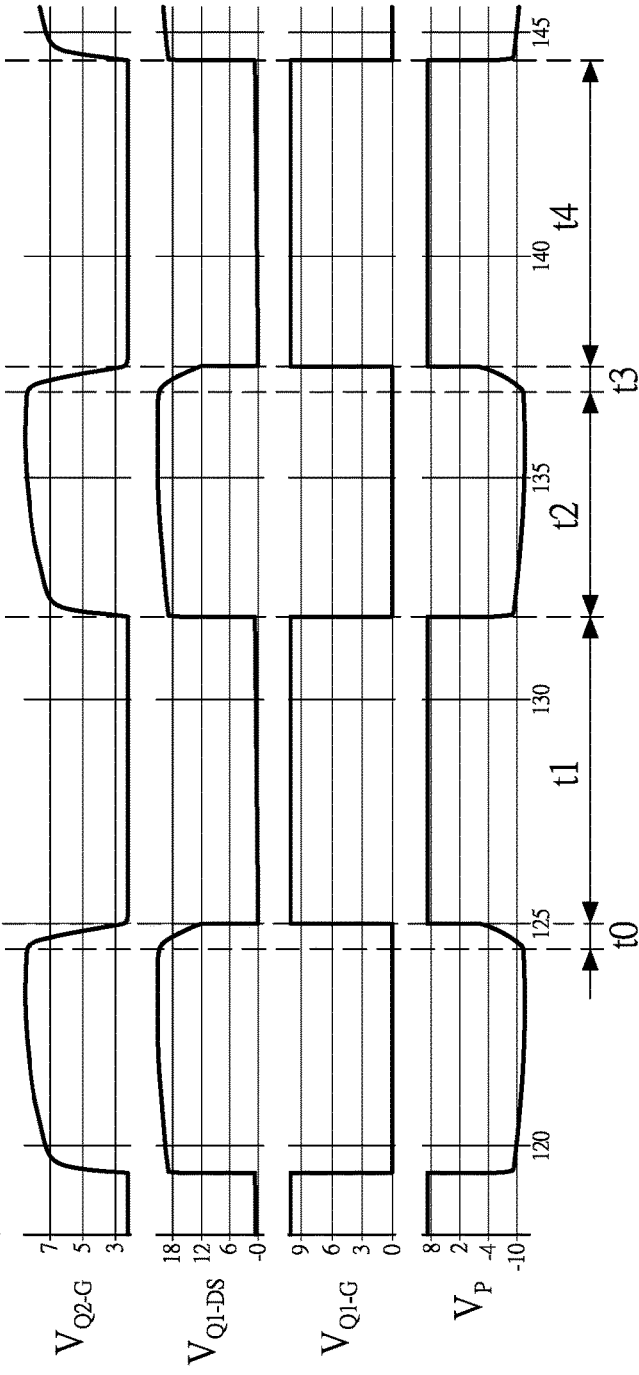

SELF-DRIVEN ACTIVE CLAMP CIRCUIT

BACKGROUND OF THE INVENTION

1. Field of the Invention

The present invention relates generally to a self-driven active clamp circuit, and more particularly to an active clamp circuit applied to a flyback converter operating in a boundary current mode (BCM).

2. Description of Related Art

Among various power converters, the flyback converter is very common and may be applied for AC (alternating current)-DC (direct current) conversion or DC-DC conversion. In the flyback converter, because a transformer is applied between input and output of the flyback converter, the flyback converter has advantages of circuit isolation. The flyback converters may be categorized as standard flyback converter and active clamp flyback (ACF) converter.

For the purposes including absorption of current spikes, energy recycling, and improvement of conversion efficiency, the clamp switch, which is formed by the metal-oxide-semiconductor field-effect transistor (MOSFET), in the primary-side winding of the transformer of the ACF converter replaces the snubber diode of the standard flyback converter.

The clamp switch is controlled by an individual driving circuit to be turned on and off. Namely, the driving circuit and its power circuit for control are further added to the ACF converter, such that the whole circuit configuration will become much more complicated and detrimental to the reduction in the converter's volume. In addition, while controlling the clamp switch, how to properly drive the clamp switch has to be taken into consideration, such that the conduction loss and the switching loss of the clamp switch will not be too high to have adverse effect on the whole conversion efficiency of the power converter.

SUMMARY OF THE INVENTION

An objective of the present invention is to provide a self-driven active clamp circuit applied to a flyback converter. The present invention can turn on and off a clamp switch without adding further more driving circuits. Besides, the clamp switch while turned on has lower conduction loss and reaches a zero voltage switching (ZVS) itself, such that the switching loss of the clamp loss will be decreased.

The self-driven active clamp circuit of the present invention is applied to a flyback converter having a transformer and a switch. The self-driven active clamp circuit of the present invention comprises a clamp switch and a resistor. The clamp switch is connected between a first capacitor and a second capacitor in series, wherein another terminal of the first capacitor is connected to a first terminal of a primary-side winding of the transformer, and another terminal of the second capacitor is connected to a second terminal of the primary-side winding of the transformer and the switch of the flyback converter. A terminal of the resistor is connected to a control terminal of the clamp switch. Another terminal of the resistor is connected to the second terminal of the primary-side winding of the transformer and the switch of the flyback converter.

Preferably, the self-driven active clamp circuit of the present invention further comprises a diode. An anode of the diode is connected to the control terminal of the clamp switch. A cathode of the diode is connected to the second terminal of the primary-side winding of the transformer and the switch of the flyback converter.

Preferably, the clamp switch is a metal-oxide-semiconductor field-effect transistor (MOSFET) having a gate as the control terminal, a drain connected to the first capacitor, and a source connected to the second capacitor.

The self-driven active clamp circuit of the present invention can autonomously turn on and off the clamp switch according to the voltage polarity of the primary-side winding of the transformer. The present invention not only absorbs the current spike by the first capacitor and the second capacitor, but also provides the gate of the clamp switch with an ideal driving voltage by a proper selection for the capacitance of the second capacitor. The clamp switch while turned on may have lower on-state resistance ($R_{DS}$), such that the loss will be reduced.

BRIEF DESCRIPTION OF THE DRAWINGS

FIG. 2A is a waveform diagram of the output voltage $V_O$ as shown in FIG. 1;

FIG. 2B is a waveform diagram of the voltage $V_{C2}$ between two terminals of the second capacitor (C2) as shown in FIG. 1;

FIG. 2C is a waveform diagram of the voltage $V_{C1}$ between two terminals of the first capacitor (C1) as shown in FIG. 1;

FIG. 2D is a waveform diagram of the drain-source voltage $V_{Q2\text{-}DS}$ of the clamp switch (Q2) as shown in FIG. 1;

FIG. 2E is a waveform diagram of the voltage $V_{Q2\text{-}G}$ between the gate and the source of the clamp switch (Q2) as shown in FIG. 1;

FIG. 2F is a waveform diagram of the drain-source voltage $V_{Q1\text{-}DS}$ of the switch (Q1) of the flyback converter as shown in FIG. 1;

FIG. 2G is a waveform diagram of the gate voltage $V_{Q1\text{-}G}$ of the switch (Q1) of the flyback converter as shown in FIG. 1;

FIG. 2H is a waveform diagram of the voltage $V_P$ between two terminals of the primary-side winding of the transformer as shown in FIG. 1;

FIG. 3 is a circuit diagram of the operation that the switch (Q1) is turned off and the clamp switch (Q2) is turned on.

DETAILED DESCRIPTION OF PREFERRED EMBODIMENT(S)

Figure 1:
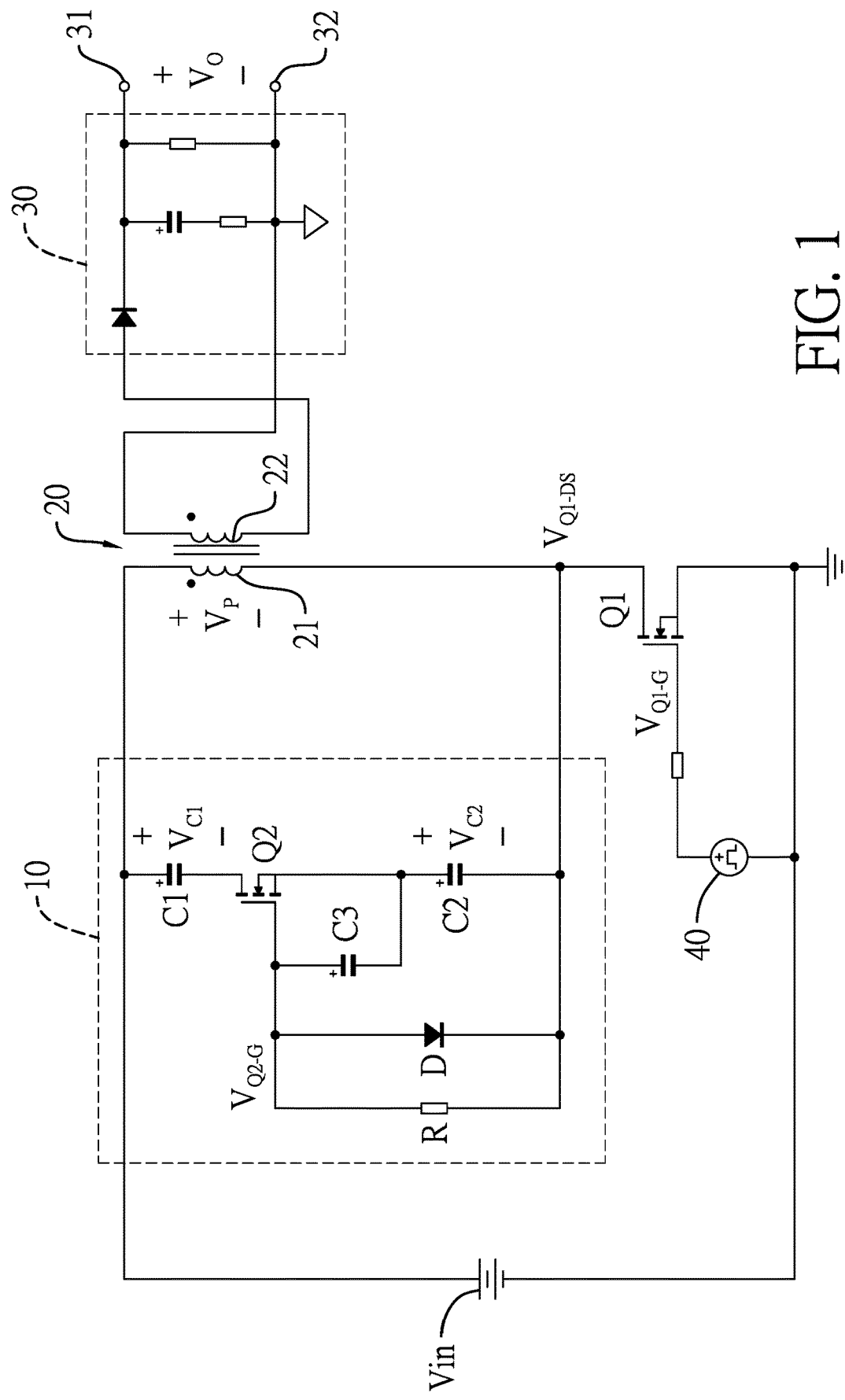
FIG. 1 is a circuit diagram of the self-driven active clamp circuit of the present invention applied to the flyback converter.

The self-driven active clamp circuit of the present invention is applied to a flyback converter. FIG. 1 shows an example of a circuit configuration of the flyback converter. Working principle of the flyback converter is not the focus in the present invention, so is introduced briefly as follows.

At first, fundamental components of the flyback converter may comprise a transformer 20, a switch Q1, and an output circuit 30. A primary-side winding 21 of the transformer 20 is connected to the switch Q1 in series. The switch Q1 may be formed by a metal-oxide-semiconductor field-effect transistor (hereinafter referred to as MOSFET), having a gate connected to a pulse width modulation (hereinafter referred to as PWM) controller 40. The PWM controller 40 outputs a PWM signal to the switch Q1 to turn on or off the switch Q1. A drain of the switch Q1 is connected to the primary-side winding 21. The source of the switch Q1 is grounded. A terminal of the primary-side 21 of the transformer 20 is connected to an input power Vin, such as a DC (direct current) power as an example herein.

The output circuit 30 is connected to a secondary-side winding 22 of the transformer 20 and comprises two output terminals 31, 32 to be connected to load(s). The primary-side winding 21 and the secondary-side winding 22 of the transformer 20 are not connected to a same ground.

The self-driven active clamp circuit 10 of the present invention is connected to the transformer 20 and the switch Q1 and comprises a clamp switch Q2, a first capacitor C1, a second capacitor C2, and a resistor R. The self-driven active clamp circuit 10 of the present invention may further comprise a diode D. A terminal of the clamp switch Q2 is connected to the first capacitor C1. Another terminal of the clamp switch Q2 is connected to the second capacitor C2. Hence, the clamp switch Q2 is connected between the first capacitor C1 and a second capacitor C2 in series. A control terminal of the clamp switch Q2 is connected to the resistor R and the diode D.

In an embodiment of the present invention, the clamp switch Q2 is formed by a MOSFET. A parasitic capacitance C3 exists between a gate and a source of the clamp switch Q2. The gate of the clamp switch Q2 is deemed as the above-mentioned control terminal. A drain and the source of the clamp switch Q2 are connected to the first capacitor C1 and the second capacitor C2 respectively.

A terminal of the first capacitor C1 is connected to the primary-side winding 21 of the transformer 20 and the input power Vin. Another terminal of the first capacitor C1 is connected to the drain of the clamp switch Q2.

A terminal of the second capacitor C2 is connected to the source of the clamp switch Q2. Another terminal of the second capacitor C2 is connected to the drain of the switch Q1 of the flyback converter.

An anode of the diode D is connected to the gate of the clamp switch Q2. A cathode of the diode D is connected to the drain of the switch Q1 of the flyback converter. The resistor R is connected to two terminals of the diode D, such that the resistor R is connected across the diode D.

With reference to the voltage waveform diagrams shown in FIGS. 2A to 2H, the vertical axis represents voltage value (V), and the horizontal axis represents the time. The circuit operation of the present invention is described as follows.

Time segment t0: Under the boundary current mode (BCM), the voltage $V_P$ on the primary-side winding 21 of the transformer 20 is gradually reduced to 0V. The voltage VC on the second capacitor C2 is reduced to 0V, too. The parasitic capacitance C3 is discharged via the diode D, such that the voltage on the parasitic capacitance C3 is reduced to 0V rapidly. As a result, the gate voltage of the clamp switch Q2 will be lower than a turn-on threshold voltage (Vgs-th). Then, the clamp switch Q2 is turned off. At that time, as the voltage reduction of the voltage $V_P$ on the primary-side winding 21, the drain-source voltage $V_{Q1-DS}$ of the switch Q1 is reduced to 0V from a prior high voltage level, and a signal of high is sent to the gate voltage $V_{Q1-G}$ of the switch Q1. Control mode of the switch Q1 reaches a zero voltage switching (ZVS).

Time segment t1: The switch Q1 is turned on. In other words, the switch Q1 changes to on-state from a prior off-state. The voltage $V_P$ of the primary-side winding 21 rises to Vin from 0V.

Figure 3:
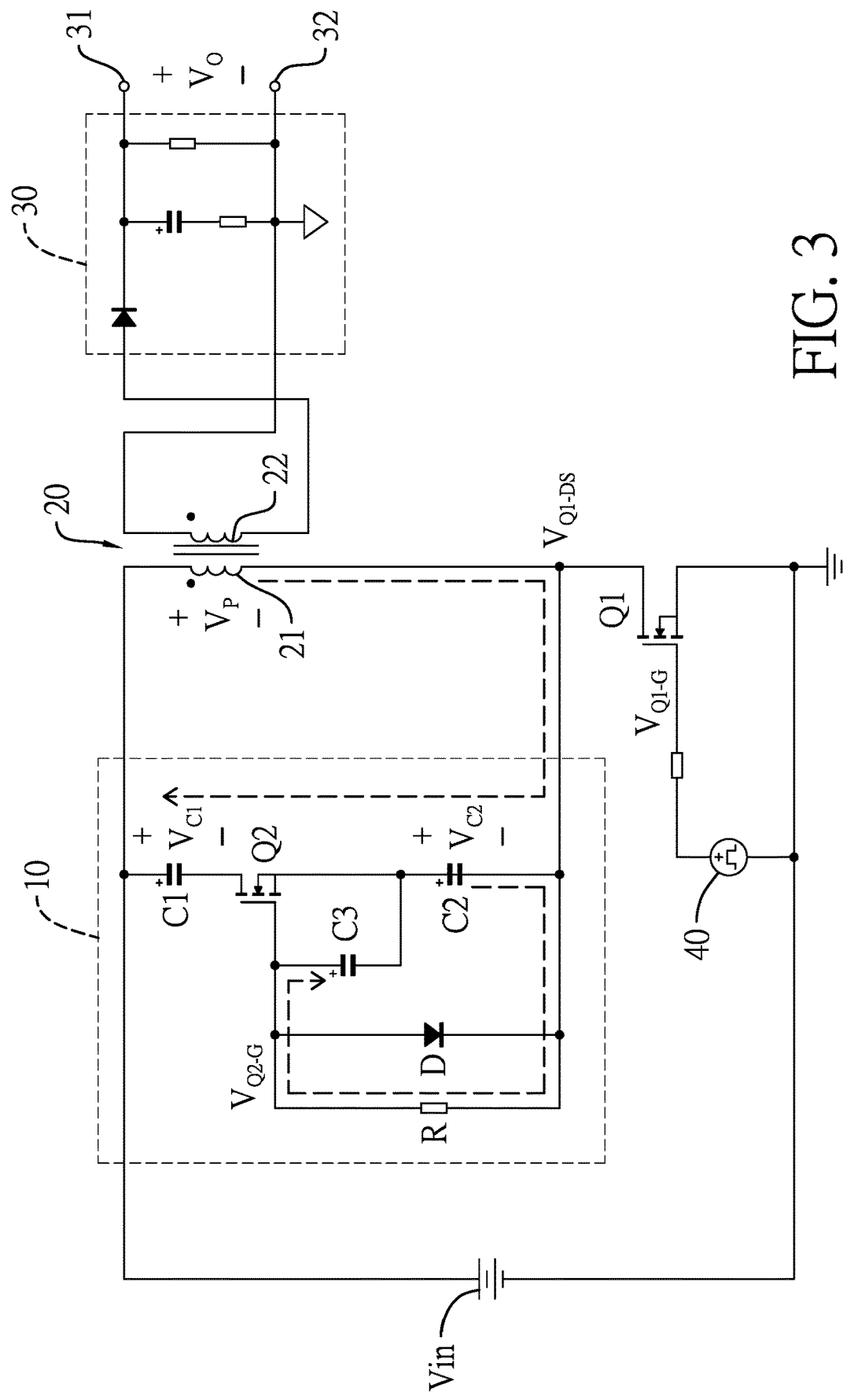

Time segment t2: When gate voltage $V_{Q1-G}$ of the switch Q1 is reduced to a low voltage level (such as the low level in the PWM signal), the switch Q1 changes to the off-state. Because the switch Q1 changes to off-state from a prior on-state, an inverse voltage is generated on the primary-side winding 21 of the transformer 20, so the voltage $V_P$ of the primary-side winding 21 shown in FIG. 2H is negative. With reference to FIG. 3, the voltage $V_P$ charges the second capacitor C2 and the first capacitor C1 via a body diode of the clamp switch Q2. Within the charging duration of the second capacitor C2 and the first capacitor C1, the second capacitor C2 and the first capacitor C1 also absorb the current spike induced by the leakage inductance of the transformer 20. Then, the second capacitor C2 and the first capacitor C1 will be gradually charged to reach a steady state. Since the body diode is turned on previously, the drain-source voltage $V_{Q2-DS}$ of the clamp switch Q2 is reduced to be lower than approximation of the forward voltage (VF) of the body diode before a driving signal is sent to the clamp switch Q2, as shown in the position "S" of FIGS. 2B and 2C. Within the charging duration of the second capacitor C2, as shown in FIG. 3, the second capacitor C2 may charge the parasitic capacitance C3 via the resistor R. When the voltage on the parasitic capacitance C3 reaches the turn-on threshold voltage (Vgs-th) of the clamp switch Q2, the clamp switch Q2 changes to on-state to implement the zero voltage switching (ZVS) and absorb the current spike. The resistor R plays a role of a delay component. While charging and based on the delay time determined by the resistor R and the parasitic capacitance C3, the gate voltage $V_{Q2-G}$ of the clamp switch Q2 reaches the turn-on threshold voltage (Vgs-th) only when the drain-source voltage $V_{Q2-DS}$ is reduced to approximation of the forward voltage (VF) of the body diode, such that drive and control for the clamp switch Q2 can meet the requirement of the zero voltage switching.

Time segment t3: Under the boundary current mode (BCM), the voltage $V_P$ of the primary-side winding 21 of the transformer 20 will be reduced to 0V gradually. The voltage $V_{C2}$ on the two terminals of the second capacitor C2 is reduced to 0V, too. The parasitic capacitance C3 is discharged via the diode D, such that the voltage on the parasitic capacitance C3 is reduced to 0V rapidly. As a result, the gate voltage of the clamp switch Q2 will be lower than the turn-on threshold voltage (Vgs-th). Then, the clamp switch Q2 is turned off. Because the clamp switch Q2 can be turned off rapidly, the switching loss of the clamp switch Q2 will be decreased. The drain-source voltage $V_{Q1-DS}$ of the switch Q1 is gradually reduced to 0V from a prior high voltage level, and the operation within the time segment t0 will be repeated.

Figure 4:
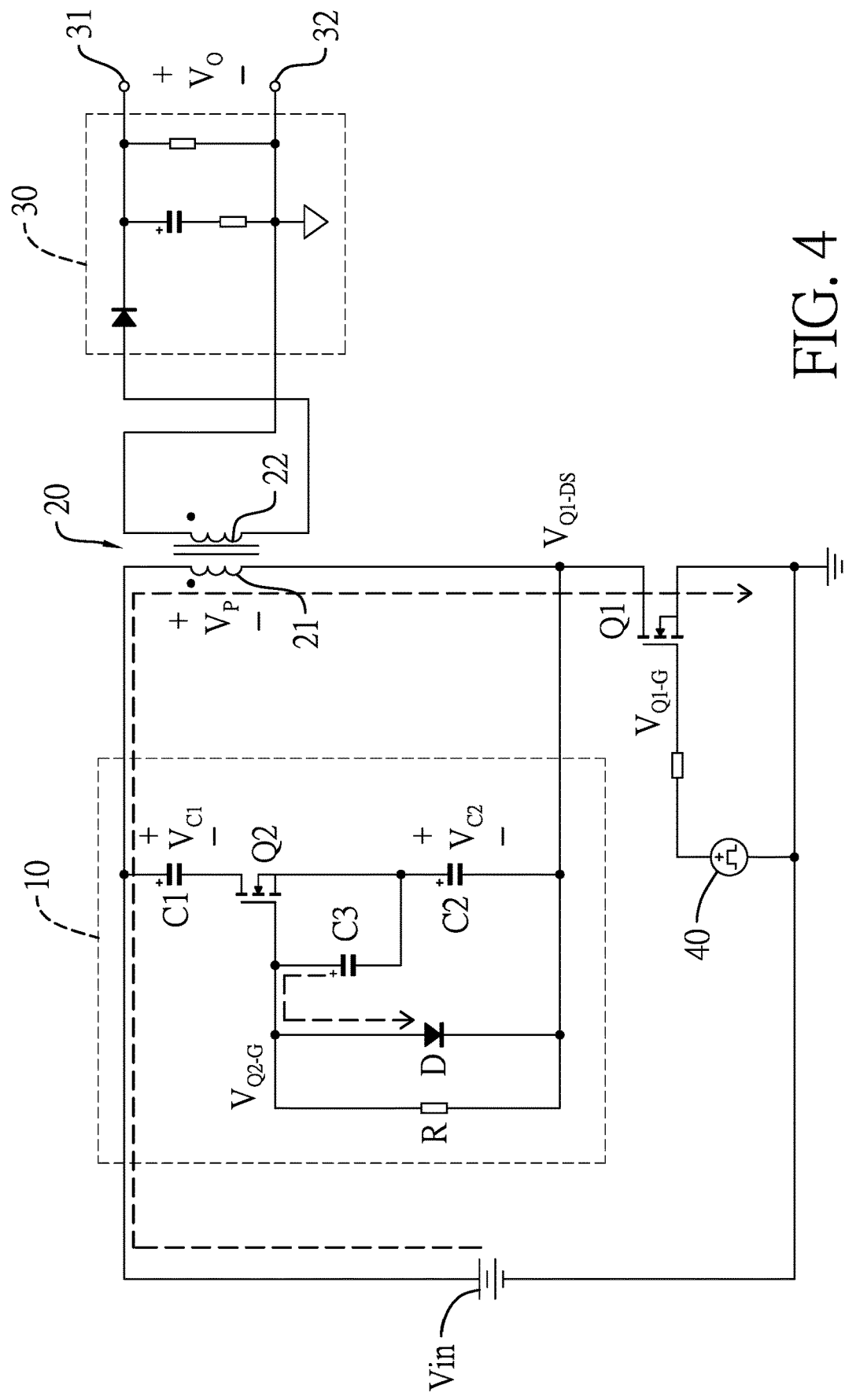
FIG. 4 is a circuit diagram of the operation that the switch (Q1) is turned on and the clamp switch (Q2) is turned off.

Time segment t4: The switch Q1 is turned on. As shown in FIG. 4, the operation within the time segment t1 will be repeated.

In a preferred embodiment, in order to minimize the on-state resistance ($R_{DS}$) and the loss of the clamp switch Q2 while turned on, an ideal driving voltage around 10V as an example should be retained on the gate of the clamp switch Q2. In general, the sum of voltage of the first capacitor C1 and the second capacitor C2, represented as $V_{C1}+V_{C2}$, is approximately equal to the voltage $V_P$ of the primary-side winding 21 while discharging, wherein $V_P$ is as the inverse voltage. At that time, the relationship regarding the voltage $V_P$, a winding number $N_P$ of the primary-side winding 21, and a winding number $N_S$ of the secondary-side winding 22 may be represented as $V_P=[(N_S/N_P)\times V_O]$. In the design practice for the converter, the voltage $V_P$ is limited by the winding ratio and fails to approximate the ideal driving voltage of 10V due to various demands for input/output. In the present invention, by selecting a proper capacitance value for the second capacitor C2, the ideal driving voltage approximating 10V will be obtained on the second capacitor C2 according to the voltage division by the first capacitor C1 and the second capacitor C2. The gate of the clamp switch Q2 will have a proper driving voltage. Then the present invention will achieve the ideal driving effect.

In conclusion, the self-driven active clamp circuit of the present invention can autonomously turn on and off the clamp switch Q2 according to the polarity of $V_P$ of the primary-side winding 21 without adding further more driving circuits. The self-driven active clamp circuit of the present invention not only absorbs the current spike, but also provides the gate of the clamp switch Q2 with the ideal driving voltage by the properly selected second capacitor C2, such that the clamp switch Q2 while turned on may have lower on-state resistance ($R_{DS}$), and the loss will be reduced.

What is claimed is:

1. A self-driven active clamp circuit applied to a flyback converter having a transformer and a switch, the self-driven active clamp circuit comprising:
   a clamp switch connected between a first capacitor and a second capacitor in series, wherein another terminal of the first capacitor is connected to a first terminal of a primary-side winding of the transformer, and another terminal of the second capacitor is connected to a second terminal of the primary-side winding of the transformer and the switch of the flyback converter;
   a resistor, wherein a terminal of the resistor is connected to a control terminal of the clamp switch, and another terminal of the resistor is connected to the second terminal of the primary-side winding of the transformer and the switch of the flyback converter; and
   a diode, wherein an anode of the diode is connected to the control terminal of the clamp switch, and a cathode of the diode is connected to the second terminal of the primary-side winding of the transformer and the switch of the flyback converter;
   wherein the clamp switch is a metal-oxide-semiconductor field-effect transistor having a gate as the control terminal, a drain connected to the first capacitor, and a source connected to the second capacitor;
   wherein a parasitic capacitance exists between the gate and the source of the clamp switch, and the parasitic capacitance is discharged via the diode;
   wherein a driving voltage for the gate of the clamp switch is obtained on the second capacitor according to voltage division by the first capacitor and the second capacitor while the primary-side winding is discharging.

2. The circuit as claimed in claim 1, wherein only when a voltage between the drain and the source of the clamp switch is reduced to 0V, a gate voltage of the clamp switch rises to turn on the clamp switch, such that the clamp switch operates in zero voltage switching (ZVS).

3. The circuit as claimed in claim 2, wherein when the clamp switch is turned on, the primary-side winding of the transformer generates an inverse voltage to charge the first capacitor and the second capacitor.

* * * * *